United States Patent
Colvin et al.

(10) Patent No.: US 9,477,236 B2
(45) Date of Patent: Oct. 25, 2016

(54) VEHICLE SYSTEM AND METHOD FOR PROVIDING ANTICIPATORY LINE PRESSURE FOR TRANSMISSION ENGAGEMENTS

(71) Applicant: FORD GLOBAL TECHNOLOGIES, LLC, Dearborn, MI (US)

(72) Inventors: Daniel Colvin, Farmington Hills, MI (US); Francis Thomas Connolly, Ann Arbor, MI (US); Marvin Paul Kraska, Dearborn, MI (US); Bernard D. Nefcy, Novi, MI (US); Hussam Makkiya, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 213 days.

(21) Appl. No.: 14/311,623

(22) Filed: Jun. 23, 2014

(65) Prior Publication Data

US 2015/0370264 A1   Dec. 24, 2015

(51) Int. Cl.
*B60W 10/04* (2006.01)
*B60W 10/10* (2012.01)
*G05D 16/20* (2006.01)
*F16H 61/00* (2006.01)

(52) U.S. Cl.
CPC ...... *G05D 16/2066* (2013.01); *F16H 61/0021* (2013.01); *B60Y 2300/18016* (2013.01); *F16H 2312/14* (2013.01)

(58) Field of Classification Search
None
See application file for complete search history.

(56) References Cited

U.S. PATENT DOCUMENTS

| | | | |
|---|---|---|---|
| 6,176,808 B1 * | 1/2001 | Brown | B60K 6/365 180/65.25 |
| 6,709,362 B2 | 3/2004 | Tomohiro et al. | |
| 8,618,765 B2 | 12/2013 | Sano et al. | |
| 2005/0178592 A1 | 8/2005 | Yamamoto et al. | |
| 2008/0308355 A1 | 12/2008 | Kakinami et al. | |
| 2013/0046425 A1 * | 2/2013 | Sime | B60W 20/00 701/22 |
| 2013/0065729 A1 * | 3/2013 | Fitzgerald | B60L 3/0023 477/8 |
| 2013/0210575 A1 | 8/2013 | Kumazaki et al. | |
| 2013/0260957 A1 | 10/2013 | Ueda et al. | |
| 2013/0297105 A1 | 11/2013 | Yamazaki et al. | |

* cited by examiner

*Primary Examiner* — Edwin A Young
(74) *Attorney, Agent, or Firm* — Carlson, Gaskey & Olds

(57) ABSTRACT

A method according to an exemplary aspect of the present discourse includes, among other things, controlling a vehicle by pressurizing a transmission pump in response to an anticipated shift change trigger. The anticipated shift change trigger may include touching a shift device of the vehicle, or detecting that a vehicle occupant is in proximity to the shift device of the vehicle.

20 Claims, 3 Drawing Sheets

VEHICLE SYSTEM AND METHOD FOR PROVIDING ANTICIPATORY LINE PRESSURE FOR TRANSMISSION ENGAGEMENTS

TECHNICAL FIELD

This disclosure relates to a vehicle, and more particularly, but not exclusively, to a vehicle system and method for pressurizing a transmission pump in response to an anticipated shift change trigger. Pressurizing the transmission pump in response to anticipated shift change triggers readies the vehicle for drive once a shift change actually occurs.

BACKGROUND

The need to reduce fuel consumption and emissions in automobiles and other vehicles is well known. Therefore, vehicles are being developed that reduce reliance or completely eliminate reliance on an internal combustion engine. Electrified vehicles are one type of vehicle currently being developed for this purpose. In general, electrified vehicles differ from conventional motor vehicles in that they are selectively driven by one or more battery powered electric machines. Conventional motor vehicles, by contrast, rely exclusively on the internal combustion engine to drive the vehicle.

Stop/start vehicles are also being developed to reduce fuel consumption and emissions by shutting down the engine during portions of the drive cycle. For example, a stop/start vehicle can turn its engine off while the vehicle is stopped rather than allow the engine to idle. The engine is subsequently restarted when the accelerator pedal is depressed or when the vehicle is otherwise able to progress.

It may be desirable to save additional energy during the drive cycle of a vehicle. One manner of achieving additional energy savings is to spin down the transmission input shaft of the vehicle transmission when the vehicle is in Park or Neutral. The transmission pump typically cannot pressurize fast enough to smoothly engage the clutches of the transmission when a shift change is subsequently requested. Although some vehicles may be equipped with auxiliary oil pumps, these pumps lack sufficient capacity to generate the pressure or flow required to perform the initial engagement/filling of the clutches of the transmission.

SUMMARY

A method according to an exemplary aspect of the present disclosure includes, among other things, controlling a vehicle by pressurizing a transmission pump in response to an anticipated shift change trigger.

In a further non-limiting embodiment of the foregoing method, the anticipated shift change trigger includes touching a shift device of the vehicle.

In a further non-limiting embodiment of either of the foregoing methods, the anticipated shift change trigger includes detecting that a vehicle occupant is in proximity to a shift device of the vehicle.

In a further non-limiting embodiment of any of the foregoing methods, the controlling step is performed if the vehicle is in Park or Neutral.

In a further non-limiting embodiment of any of the foregoing methods, the method includes starting an engine of the vehicle to pressurize the transmission pump.

In a further non-limiting embodiment of any of the foregoing methods, the method includes spinning up an electric machine of the vehicle to pressurize the transmission pump.

In a further non-limiting embodiment of any of the foregoing methods, the method includes ending the controlling step if a shift change request is not received after a threshold amount of time has passed since the anticipated shift change trigger.

In a further non-limiting embodiment of any of the foregoing methods, the method includes spinning an input shaft of a transmission by powering on a power source in response to the anticipated shift change trigger.

In a further non-limiting embodiment of any of the foregoing methods, the vehicle is a stop/start vehicle and the power source is an engine of the stop-start vehicle.

In a further non-limiting embodiment of any of the foregoing methods, the vehicle is an electrified vehicle and the power source is an electric machine of the electrified vehicle.

A method according to another exemplary aspect of the present disclosure includes, among other things, activating a sensor associated with a shift device of a vehicle, powering an input shaft of a transmission and pressurizing a transmission pump in response to powering the input shaft.

In a further non-limiting embodiment of the foregoing method, the activating step includes touching a component of the shift device.

In a further non-limiting embodiment of either of the foregoing methods, the activating step includes detecting a vehicle operator in proximity to the shift device.

In a further non-limiting embodiment of any of the foregoing methods, the powering step is performed by starting an engine of the vehicle.

In a further non-limiting embodiment of any of the foregoing methods, the powering step is performed by spinning up an electric machine of the vehicle.

A vehicle system according to another exemplary aspect of the present disclosure includes, among other things, a transmission pump and a control unit configured to command pressurization of the transmission pump in response to an anticipated shift change trigger.

In a further non-limiting embodiment of the foregoing vehicle system, the system includes a shift device and a sensor associated with the shift device. The sensor is configured to detect the anticipated shift change trigger.

In a further non-limiting embodiment of either of the foregoing vehicle systems, the anticipated shift change trigger is sensed by touching the shift device.

In a further non-limiting embodiment of any of the foregoing methods, a power source is actuable to pressurize the transmission pump.

In a further non-limiting embodiment of any of the foregoing methods, the power source is an engine or an electric machine.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a vehicle system and method for pressurizing a transmission pump in response to an anticipated shift change trigger. For example, the transmission pump may be pressurized in response to touching, or preparing to touch, a shift device of the vehicle. The anticipated shift change trigger indicates that a change in the shift position is anticipated in the near future. An input shaft of a transmission may be actuated in response to sensing the anticipated shift change trigger, such as by starting an engine or spinning an electric machine, to pressurize the transmission pump and provide anticipatory line pressure for transmission engagements. The anticipatory line pressure readies the transmission for a smooth and quick engagement of the forward or reverse clutches, thereby reducing the amount of time necessary to ready the vehicle to drive.

Figure 1:
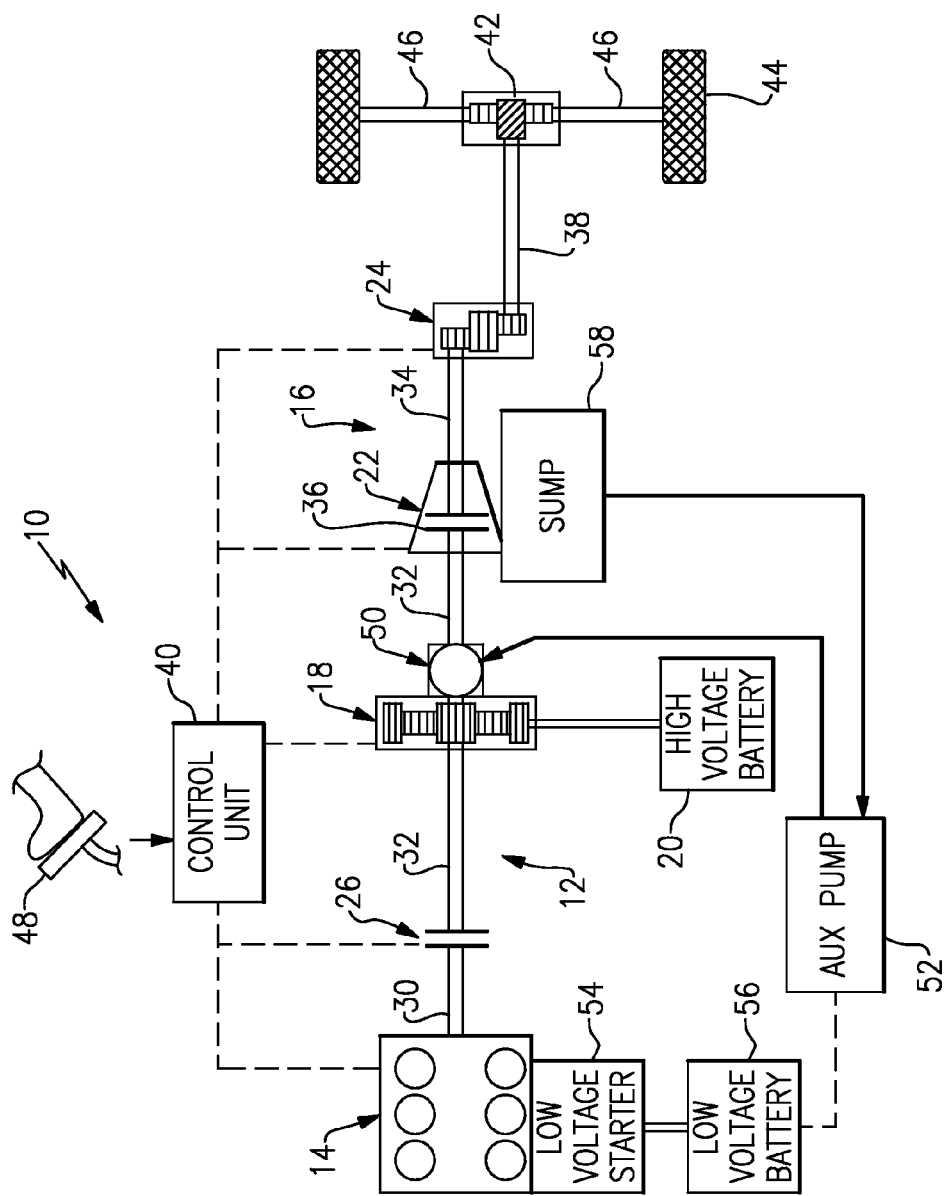
FIG. 1 schematically illustrates a powertrain of a vehicle.

FIG. 1 schematically illustrates a vehicle 10. Although illustrated as a hybrid electric vehicle (HEV) in some embodiments, the present disclosure may be applicable to other types of vehicles, including a stop/start vehicle. In addition, although a specific component relationship is illustrated in FIG. 1, this illustration is not intended to limit this disclosure. In other words, it should be readily understood that the placement and orientation of the various components of the vehicle 10 could vary within the scope of this disclosure.

The exemplary vehicle 10 includes a powertrain 12. The powertrain 12 includes an engine 14 and a transmission system 16 that is selectively driven by the engine 14. In one embodiment, the transmission system 16 is a modular hybrid transmission (MHT). The transmission system 16 can include an electric machine 18 powered by a high voltage battery 20, a torque converter 22, and a multiple-step ratio automatic transmission, or gearbox 24. In one embodiment, the electric machine 18 is configured as an electric motor. However, the electric machine 18 could alternatively be configured as a generator or a combined motor/generator within the scope of this disclosure.

The engine 14 and the electric machine 18 may both be employed as available drive sources for the vehicle 10. The engine 14 generally represents a power source that may include an internal combustion engine such as a gasoline, diesel, or natural gas powered engine, or a fuel cell. The engine 14 generates power and corresponding torque that is supplied to the electric machine 18 when an engine disconnect clutch 26 that is disposed between the engine 14 and the electric machine 18 is engaged.

In some embodiments, the engine 14 is started using the electric machine 18 to rotate the engine 14 using torque provided through the engine disconnect clutch 26. Alternatively, the vehicle 10 may be equipped with a low voltage starter 54 operatively connected to the engine 14, for example, through a belt or gear drive. The starter 54 may be used to provide torque to start the engine 14 without the addition of torque from the electric machine 18. The starter 54 may be powered by the high voltage battery 20, or the vehicle 10 can include a low voltage battery 56 to provide power to the starter 54 and/or other vehicle components.

The electric machine 18 may be any one of a plurality of types of electric machines. By way of one non-limiting embodiment, the electric machine 18 could be a permanent magnet synchronous motor.

When the engine disconnect clutch 26 is at least partially engaged, power flow from the engine 14 to the electric machine 18 or from the electric machine 18 to the engine 14 is possible. For example, the engine disconnect clutch 26 may be engaged and the electric machine 18 may operate as a generator to convert rotational energy provided by a crankshaft 30 and an electric machine shaft 32 into electrical energy to be stored in the battery 20. The engine disconnect clutch 26 can also be disengaged to isolate the engine 14 from the remainder of the powertrain 12 such that the electric machine 18 can act as the sole power source for propelling the vehicle 10.

The electric machine shaft 32 may extend through the electric machine 18. The electric machine 18 is continuously drivably connected to the electric machine shaft 32, whereas the engine 14 is drivably connected to the electric machine shaft 32 only when the engine disconnect clutch 26 is at least partially engaged.

The electric machine 18 is connected to the torque converter 22 via the electric machine shaft 32. The torque converter 22 is therefore connected to the engine 14 when the engine disconnect clutch 26 is at least partially engaged. The torque converter 22 includes an impeller fixed to the electric machine shaft 32 and a turbine fixed to a transmission input shaft 34. The torque converter 22 thus provides a hydraulic coupling between the electric machine shaft 32 and the transmission input shaft 34.

The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 36 may also be provided. When engaged, the torque converter bypass clutch 36 frictionally or mechanically couples the impeller and the turbine of the torque converter 22 to enable a more efficient power transfer. The torque converter bypass clutch 36 may be operated as a launch clutch to provide smooth vehicle launch. Alternatively, or in combination, a launch clutch similar to the engine disconnect clutch 26 may be provided between the electric machine 18 and the transmission gearbox 24 for applications that do not include a torque converter 22 or a torque converter bypass clutch 36. In some embodiments, the engine disconnect clutch 26 is generally referred to as an upstream clutch and the torque converter bypass clutch 36 (which may be a launch clutch) is generally referred to as a downstream clutch.

The transmission gearbox 24 may include gear sets (not shown) that are selectively operated using different gear ratios by selective engagement of friction elements such as clutches, planetary gears, and brakes (not shown) to establish the desired multiple discrete or step drive ratios. The friction elements are controllable through a shift schedule that connects and disconnects certain elements of the gear sets to control the ratio between a transmission output shaft 38 and the transmission input shaft 34. The transmission gearbox 24 may be automatically shifted from one ratio to another based on various vehicle and ambient operating conditions by an associated controller. The transmission gearbox 24 then provides powertrain output torque to the transmission output shaft 38.

It should be understood that the hydraulically controlled transmission gearbox 24 used with a torque converter 22 is but one non-limiting embodiment of a gearbox or transmission arrangement and that any multiple ratio gearbox that accepts input torque(s) from an engine and/or a motor and then provides torque to an output shaft at the different ratios is acceptable for use with the embodiments of this disclosure. For example, the transmission gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

The transmission output shaft 38 may be connected to a differential 42. The differential 42 drives a pair of wheels 44 via respective axles 46 that are connected to the differential 42. In one embodiment, the differential 42 transmits approximately equal torque to each wheel 44 while permitting slight speed differences such as when the vehicle turns a corner. Different types of differentials or similar devices may be used to distribute torque from the powertrain 12 to one or more wheels 44. In some applications, torque distribution may vary depending on the particular operating mode or condition, for example.

Pressurized fluid for the transmission system 16 may be provided by a transmission pump 50. The transmission pump 50 may be connected to or adjacent to the electric machine 18 such that it rotates with the electric machine 18 and the electric machine shaft 32 to pressurize and provide sufficient line pressure for full operation of the transmission gearbox 24. When the portion of the electric machine shaft 32 containing the transmission pump 50 is at rest, the transmission pump 50 is also at rest and is inactive.

In order to provide pressurized transmission fluid when the transmission pump 50 is inactive, an auxiliary pump 52 can also be provided. The auxiliary pump 52 may be electrically powered, for example by the low voltage battery 56. In some embodiments, the auxiliary pump 52 provides a portion of the transmission fluid for the transmission gearbox 24 such that the transmission gearbox 24 is limited in operation, for example to certain actuators or gearing ratios, when the auxiliary pump 52 is operating.

Cooled transmission fluid, such as oil, may settle in a sump 58 from the torque converter 22. The auxiliary pump 52 may pump transmission fluid from the sump 58 to the transmission pump 50 during certain conditions.

The powertrain 12 may additionally include an associated control unit 40. While schematically illustrated as a single controller, the control unit 40 may be part of a larger control system and may be controlled by various other controllers throughout the vehicle 10, such as a vehicle system controller (VSC) that includes a powertrain control unit, a transmission control unit, an engine control unit, etc. It should therefore be understood that the control unit 40 and one or more other controllers can collectively be referred to as a "control unit" that controls, such as through a plurality of interrelated algorithms, various actuators in response to signals from various sensors to control functions such as starting/stopping the engine 14, operating the electric machine 18 to provide wheel torque or charge the battery 20, selecting or scheduling transmission shifts, actuating the engine disconnect clutch 26, etc. In one embodiment, the various controllers that make up the VSC may communicate with one another using a common bus protocol (e.g., CAN).

The control unit 40 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or nonvolatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The control unit 40 may also communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

As schematically illustrated in FIG. 1, the control unit 40 may communicate signals to and/or from the engine 14, the engine disconnect clutch 26, the electric machine 18, the torque converter bypass clutch 36, the transmission gearbox 24, and/or other components. Although not explicitly illustrated, those of ordinary skill in the art will recognize various functions or components that may be controlled by the control unit within each of the subsystems identified above. Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for engine disconnect clutch 26, torque converter bypass clutch 36, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 36 status (TCC), deceleration or shift mode, for example.

Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 48 may be used by the driver of the vehicle 10 to provide a demanded torque, power, or drive command to propel the vehicle 10. In general, depressing and releasing the accelerator pedal 48 generates an accelerator pedal position signal that may be interpreted by the control unit 40 as a demand for increased power or decreased power, respectively. Based at least upon input from the accelerator pedal 48, the control unit 40 commands torque from the engine 14 and/or the electric machine 18. The control unit 40 also controls the timing of gear shifts within the transmission gearbox 24, as well as engagement or disengagement of the engine disconnect clutch 26 and the torque converter bypass clutch 36. Like the engine disconnect clutch 26, the torque converter bypass clutch 36 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 36 may be operated as locked or open without using a modulated operating mode depending on the particular application.

To drive the vehicle 10 with the engine 14, the engine disconnect clutch 26 is at least partially engaged to transfer at least a portion of the engine torque through the engine disconnect clutch 26 to the electric machine 18, and then from the electric machine 18 through the torque converter 22 and the transmission gearbox 24. The electric machine 18 may assist the engine 14 by providing additional power to turn the electric machine shaft 32. This operation mode may be referred to as a "hybrid mode" or an "electric assist mode."

To drive the vehicle 10 using the electric machine 18 as the sole power source, the power flow remains the same except the engine disconnect clutch 26 isolates the engine 14 from the remainder of the powertrain 12. Combustion in the engine 14 may be disabled or otherwise turned OFF during this time to conserve fuel. The power electronics (not shown) may convert DC voltage from the battery 20 into AC voltage to be used by the electric machine 18. The control unit 40 commands the power electronics to convert voltage from the battery 20 to an AC voltage provided to the electric machine 18 to provide positive or negative torque to the electric machine shaft 32. This operation mode may be referred to as an "electric only" or "EV" operation mode.

In any mode of operation, the electric machine 18 may act as a motor and provide a driving force for the powertrain 12. Alternatively, the electric machine 18 could act as a generator and convert kinetic energy from the vehicle 10 into electric energy to be stored in the battery 20. The electric machine 18 may act as a generator while the engine 14 is providing propulsion power for the vehicle 10, for example. The electric machine 18 may additionally act as a generator during times of regenerative braking in which rotational energy from spinning the wheels 44 is transferred back through the transmission gearbox 24 and is converted into electrical energy for storage in the battery 20.

It should be understood that highly schematic depiction of FIG. 1 is merely exemplary and is not intended to be limiting on this disclosure. Other configurations are additionally or alternatively contemplated.

For example, in some embodiments, the vehicle 10 may be a stop/start vehicle. In one exemplary stop/start sequence of the vehicle 10, the engine 14 can be automatically shut down during times when the vehicle 10 is not moving and then automatically restarted as necessary when the vehicle 10 begins to move again or when it becomes necessary to operate accessories off of the engine 14. In this regard, the vehicle 10 may include an automatic stop/start system that automatically shuts down and restarts the engine 14 to reduce the amount of time the engine spends idling, thereby reducing fuel consumption and emissions. Automatically shutting down the engine 14 can be advantageous for vehicles that spend significant amounts of time waiting at traffic lights or frequently operate in stop-and-go traffic. The vehicle 10 may enter an auto-stop mode (i.e., the engine 14 is auto-stopped) when certain vehicle propulsion conditions are met, such as when the driver has applied the brakes and the vehicle speed is below a predetermined speed threshold. Once the driver indicates a request for vehicle propulsion (e.g., by releasing the brake pedal), the control unit 40 may automatically command a restart of the engine 14. Although FIG. 1 is depicted as including components such as the engine disconnect clutch 26 and the electric machine 18, a vehicle equipped with stop/start technology would not necessarily require all the components illustrated in FIG. 1.

Figure 2:
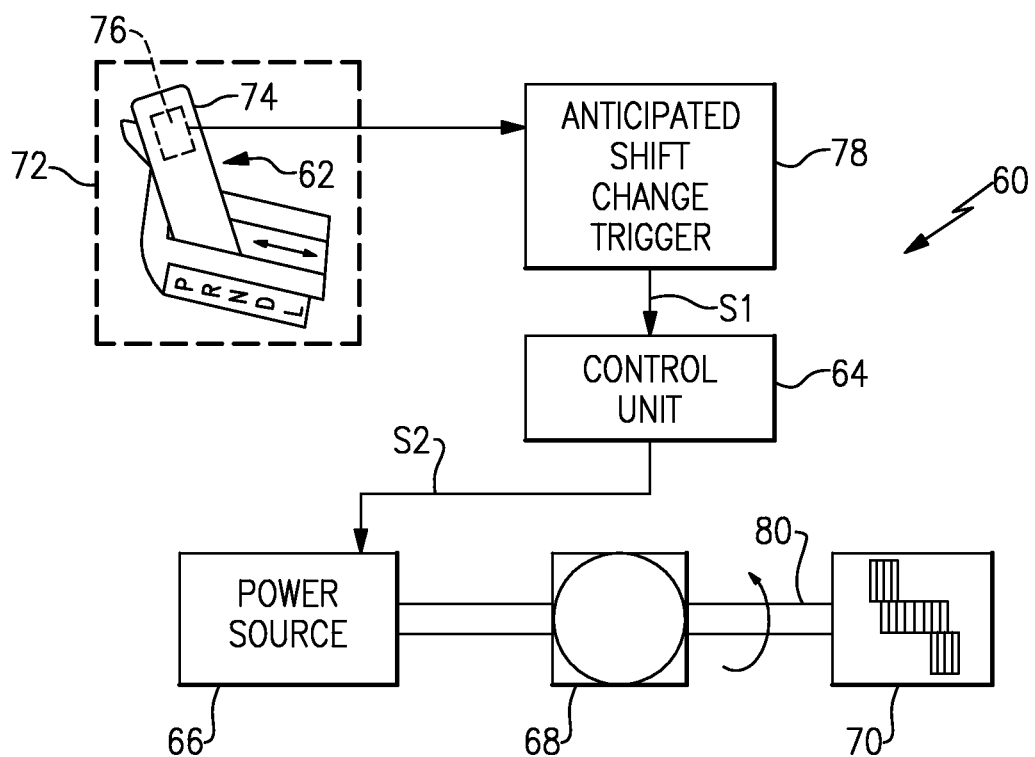
FIG. 2 illustrates a vehicle system that can be employed by a vehicle.

FIG. 2 illustrates a vehicle system 60 that may be incorporated into a vehicle, such as the vehicle 10 of FIG. 1 or any other vehicle. The vehicle system 60 is adapted to provide anticipatory line pressure for transmission engagements, as is further discussed below.

In one non-limiting embodiment, the exemplary vehicle system 60 includes a shift device 62, a control unit 64, a power source 66, a transmission pump 68, and a transmission gearbox 70. The shift device 62 may be located within a passenger compartment 72 (shown schematically) located on-board a vehicle and is generally used to change a gear of the transmission gearbox 70. The shift device 62 may be a shift lever that includes a handle 74 and a sensor 76 fitted to the handle 74. In one embodiment, the sensor 76 is housed inside the handle 74. However, the sensor 76 could alternatively be positioned such that it is remote from the handle 74. In another non-limiting embodiment, the shift device 62 could include an electronic shift device that includes one or more joysticks, dials and/or buttons.

In one embodiment, the sensor 76 is adapted to sense an anticipated shift change trigger 78. Generally, the anticipated shift change trigger 78 instructs the vehicle system 60 that a vehicle operator or driver intends to change a position of the shift device 62 in the near future. Stated another way, the anticipated shift change trigger 78 may indicate that it is likely the vehicle operator is preparing to shift the shift device 62 from Park or Neutral into a drive gear or reverse.

In one non-limiting embodiment, the sensor 76 is activated when the vehicle operator touches the handle 74 of the shift device 62. For example, the sensor 76 could be a capacitive sensor in such an embodiment.

In another embodiment, the sensor 76 is activated when a vehicle operator has positioned themselves in relative proximity to the shift device 62, and therefore, in relative proximity to the sensor 76. For example, the sensor 76 could be a proximity sensor adapted to visually or audibly detect the presence of the vehicle operator in proximity to the shift device 62. It should be understood that any type of sensor may utilized by the vehicle system 60 to sense the anticipated shift change trigger 78.

The control unit 64 is in communication with the sensor 76. The control unit 64 may be part of an overall vehicle control unit, such as the control unit 40 of FIG. 1, or could alternatively be a stand-alone control unit separate from the control unit 40.

When activated, a signal S1 can be communicated to the control unit 64 indicating that an anticipated shift change trigger 78 has been sensed. In one embodiment, the control unit 64 is adapted to command pressurization of the transmission pump 68 in response to the signal S1 indicating the anticipated shift change trigger 78 has occurred.

The control unit 64 may communicate a signal S2 to the power source 66 in response to receiving the signal S1. The signal S2 instructs the power source 66 to power on in order to spin an input shaft 80 of the transmission gearbox 70. In one embodiment, the power source 66 is an engine and is powered on by being started. In another embodiment, the power source 66 is an electric machine and is powered on by spinning up the electric machine.

Spinning the input shaft 80 pressurizes the transmission pump 68 such that it is made ready to communicate a sufficient amount of transmission fluid to the clutches, gears and other components of the transmission gearbox 70. In other words, the vehicle system 60 provides anticipatory line pressure to the transmission pump 68 in order to prepare for a relatively smooth and quick engagement of the forward and reverse clutches of the transmission gearbox 70.

Figure 3:
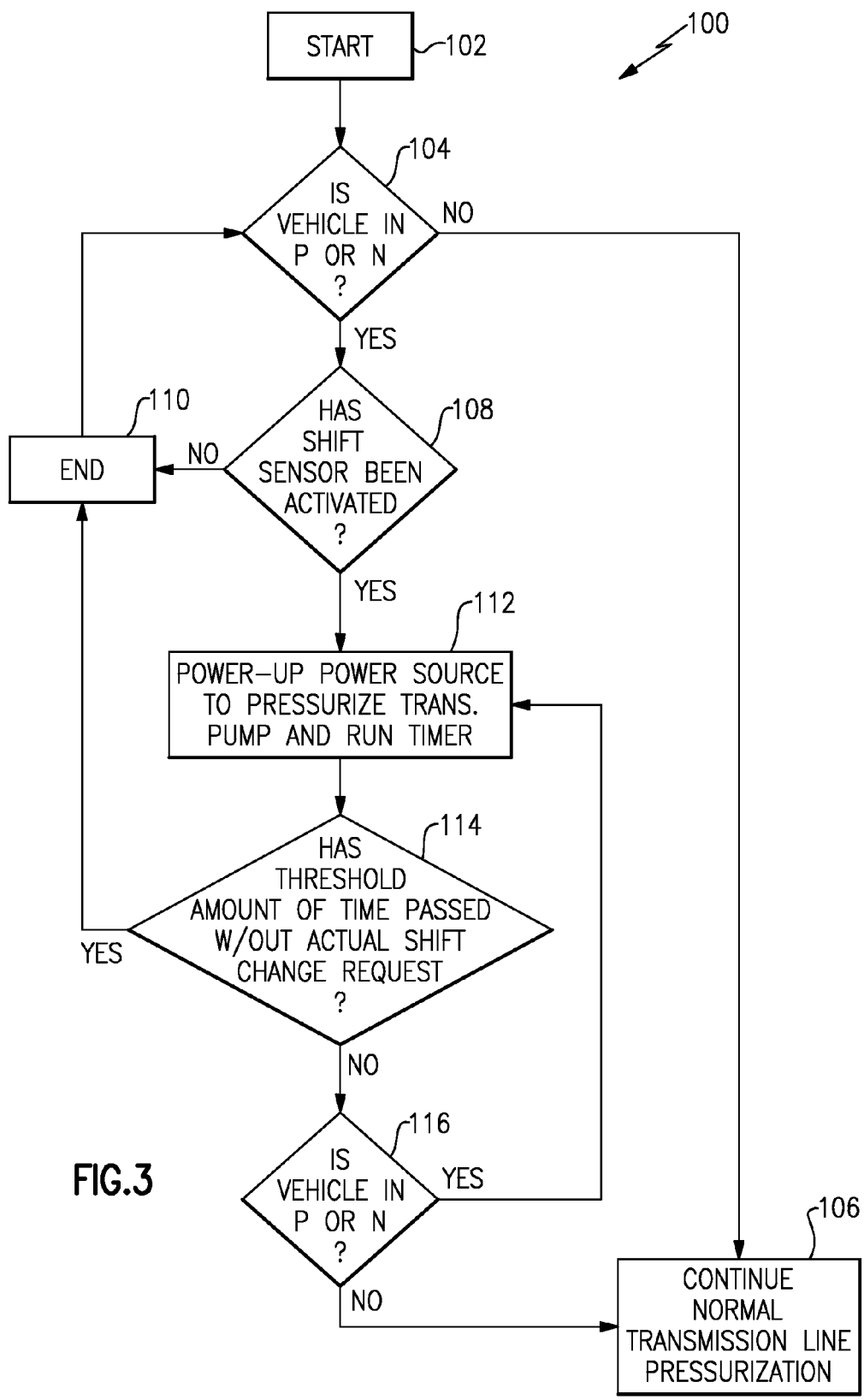
FIG. 3 schematically illustrates a vehicle control strategy for pressurizing a transmission pump in response to an anticipated shift change trigger.

FIG. 3, with continued reference to FIGS. 1 and 2, schematically illustrates a vehicle control strategy 100 of a vehicle 10 that has been equipped with the vehicle system 60 described above. The exemplary vehicle control strategy 100 may be performed to provide anticipatory line pressure for anticipated transmission engagements. Of course, the vehicle system 60 is capable of implementing and executing other control strategies within the scope of this disclosure. In one embodiment, the control unit 64 of the vehicle system 60 may be programmed with one or more algorithms adapted to execute the vehicle control strategy 100, or any other control strategy.

As shown in FIG. 3, the vehicle control strategy 100 begins at block 102. At block 104, the vehicle system 60 determines whether the vehicle is in Park or Neutral. If the vehicle is not in either Park or Neutral gear, the vehicle control strategy 100 proceeds to block 106 and line pressure control is continued. In other words, normal line pressurization of the transmission gearbox 70 is performed using the transmission pump 68. However, if it is determined the vehicle is in Park or Neutral, the vehicle control strategy 100 may proceed to block 108.

At block 108, the vehicle system 60 determines whether the sensor 76 of the shift device 62 has been activated. In other words, the vehicle system 60 determines whether an anticipated shift change trigger 78 has been sensed by the sensor 76. In one embodiment, the sensor 76 is activated in response to touching a component of the shift device 62 (e.g., a handle, button, lever, dial, joystick, etc.). In another embodiment, the sensor 76 is activated if a vehicle operator has positioned themselves in relative proximity to the shift device 62. If the sensor 76 has not been activated, the vehicle control strategy 100 ends at block 110 (i.e., the power source 66 is not powered on to pressurize the transmission pump 68). The vehicle control strategy 100 may then return to block 104 to periodically repeat the vehicle control strategy 100.

Alternatively, if the sensor 76 has been activated at block 108, the power source 66 may be powered on to begin spinning up the input shaft 80 of the transmission gearbox 70 as shown at block 112. Spinning the input shaft 80 in this manner is sufficient to begin pressurizing the transmission pump 68 (i.e., provide anticipatory line pressure). A timer also begins to run at block 112 once the transmission pump 68 starts to pressurize.

At block 114, the vehicle system 60 determines whether a shift change request has been received within a threshold amount of time of providing the anticipatory line pressure. If an actual shift change request has not been received before a threshold amount of time has passed, the vehicle control strategy 100 may be ended at block 110 by shutting the power source 66 off. However, if a threshold amount of time has not yet passed since performing block 112 or a shift change request is received, the vehicle control strategy 100 may proceed to block 116.

The vehicle system 60 again determines whether the vehicle is in Park or Neutral at block 116. If yes, the vehicle control strategy 100 returns to block 112. If no, the vehicle control strategy 100 proceeds to block 106 and continues normal line pressurization of the transmission gearbox 70.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
controlling a vehicle by pressurizing a transmission pump in response to an anticipated shift change trigger associated with a shift device used to change a gear of a transmission of the vehicle.

2. The method as recited in claim 1, wherein the anticipated shift change trigger includes touching the shift device of the vehicle.

3. The method as recited in claim 1, wherein the anticipated shift change trigger includes detecting that a vehicle occupant is in proximity to the shift device of the vehicle.

4. The method as recited in claim 1, comprising starting an engine of the vehicle to pressurize the transmission pump.

5. The method as recited in claim 1, comprising ending the controlling step if a shift change request is not received after a threshold amount of time has passed since the anticipated shift change trigger.

6. The method as recited in claim 1, comprising spinning an input shaft of the transmission by powering on a power source in response to the anticipated shift change trigger.

7. The method as recited in claim 6, wherein the vehicle is a stop/start vehicle and the power source is an engine of the stop/start vehicle.

8. The method as recited in claim 6, wherein the vehicle is an electrified vehicle and the power source is an electric machine of the electrified vehicle.

9. A method, comprising:
controlling a vehicle by pressuring a transmission pump in responce to an anticipated shift change trigger, wherein the controlling step is performed if the vehicle is in Park or Neutral.

10. A method comprising:
controlling a vehicle by pressuring a transmission pump in response to an anticipated shift change trigger, wherein the controlling step includes spinning up an electric machine of the vehicle to pressurize the transmission pump.

11. A method, comprising:
sensing activation of a shift device of a vehicle, the shift device adapted to change a gear of a transmission;
powering an input shaft of the transmission; and
pressurizing a transmission pump in response to powering the input shaft.

12. The method as recited in claim 11, wherein the sensing step includes sensing whether a component of the shift device has been touched.

13. The method as recited in claim 11, wherein the sensing step includes detecting a vehicle operator in proximity to the shift device.

14. The method as recited in claim 11, wherein the powering step is performed by starting an engine of the vehicle.

15. The method as recited in claim 11, wherein the powering step is performed by spinning up an electric machine of the vehicle.

16. A vehicle system, comprising:
a transmission;
a shift device adapted to change a gear of said transmission;
a transmission pump; and
a control unit configured to command pressurization of said transmission pump in response to an anticipated shift change trigger associated with the shift device.

17. The vehicle system as recited in claim 16, comprising a sensor associated with said shift device, said sensor configured to detect said anticipated shift change trigger.

18. The vehicle system as recited in claim 17, wherein said anticipated shift change trigger is sensed by touching said shift device.

19. The vehicle system as recited in claim 16, comprising a power source actuable to pressurize said transmission pump.

20. The vehicle system as recited in claim 19, wherein said power source is an engine or an electric machine.

* * * * *

UNITED STATES PATENT AND TRADEMARK OFFICE
CERTIFICATE OF CORRECTION

PATENT NO.         : 9,477,236 B2                              Page 1 of 1
APPLICATION NO.    : 14/311623
DATED              : October 25, 2016
INVENTOR(S)        : Daniel Colvin et al.

It is certified that error appears in the above-identified patent and that said Letters Patent is hereby corrected as shown below:

In the Claims

In Claim 9, Column 11, Line 2; delete "pressuring" and replace with --pressurizing--

In Claim 9, Column 11, Line 3; delete "responce" and replace with --response--

In Claim 10, Column 11, Line 7; delete "pressuring" and replace with --pressurizing--

Signed and Sealed this
Seventeenth Day of January, 2017

Michelle K. Lee
*Director of the United States Patent and Trademark Office*